United States Patent [19]

Rottmann et al.

[11] 4,069,896
[45] Jan. 24, 1978

[54] METHOD OF SIGNALING MENU COMPONENTS WHICH ARE TO BE SERVED OUT FROM SUPPLY CONTAINERS OF SUPPLY CARRIAGES ASSOCIATED WITH SUPPLY STATIONS

[75] Inventors: Werner Rottmann, Frankfurt am Main; Reinhard Seyer, Hainhaussen; Hans-Eberhard Siebert, Neu-Isenburg, all of Germany

[73] Assignee: Licentia Patent-Verwaltungs-G.m.b.H., Germany

[21] Appl. No.: 723,226

[22] Filed: Sept. 15, 1976

[30] Foreign Application Priority Data

Sept. 17, 1975 Germany ............................ 2541334

[51] Int. Cl.² ............................................ E04H 3/04
[52] U.S. Cl. ................................. 186/1 B; 186/1 R; 214/11 C
[58] Field of Search ..................... 186/1 R, 1 B, 1 D; 214/11 R, 11 A, 11 C

[56] References Cited

U.S. PATENT DOCUMENTS

3,725,867   4/1973   Jordan ................................ 214/11 R
3,876,038   4/1975   Riller ................................... 186/1 B Primary Examiner—Duane A. Reger
Assistant Examiner—Reinhard J. Eisenzopf
Attorney, Agent, or Firm—McGlew and Tuttle

[57] ABSTRACT

Each supply station has an assigned station number, and the respective carriages are positioned along both sides of an endless delivery belt for menu-component-receiving trays, and an electronic food service control is provided. Each carriage is divided into three sections with each section having three container areas therein with a respective signal lamp associated with each container area and mounted on a respective lamp arm, each lamp arm being associated with the respective section. Each section is arranged to receive either one full-size supply container, two half-size supply containers or three one-third size supply containers. A tray dispenser, responsive to a signal from the service control, delivers successive trays to the endless delivery belt. In a first step, the position of each tray is determined and stored and a menu request is read-in to the service control. In a second step, the travel of each tray past the stations and the respective assigned station numbers are determined from the initial position of each tray and the predetermined positions of the supply stations along the delivery belt. Upon coincidence of the tray position data and the supply station data, and through a menu request address, the stored menu request, which has been associated with the tray in the initial position of the tray on the endless belt, is retrieved. Upon lighting of one or more signal lamps on a carriage, a server places the corresponding supply containers on the component-receiving tray at the station. The method may be used to supply a customer with either individual food items, a predetermined menu comprising several food items, or both.

8 Claims, 13 Drawing Figures

MENU CHART

| | | |
|---|---|---|
| MENU 1 | LIQUID II | : THICKENED SOUP |
| MENU 2 | MEATLESS | : 2 SCRAMBLED EGGS<br>MESHED POTATOES WITH MILK<br>DIETETIC VEGETABLE<br>FRUIT SOUP |
| MENU 3 | NORMAL | : POT ROAST<br>BOILED POTATOES<br>GREEN BEANS<br>POT ROAST GRAVY<br>MEAL BROTH |
| MENU 4 | ULCER II | : ZWIEBACK<br>MILK CEREAL |
| MENU 5 | ULCER III, SALTLESS | : STRAINED VEAL<br>RICE<br>STRAINED LIGHT VEGETABLE<br>FAT-FREE BROTH |
| MENU 6 | DIABETIC | : 60 G OF LEAN MEAT<br>BOILED POTATOES<br>300 G OF VEGETABLE / 10 G FAT<br>LEAN MEAT GRAVY<br>BROTH WITH FLAVOURS |
| MENU 7 | BILE | : MESHED POTATOES WITH WATER<br>FRUIT SOUP |

FOOD PROGRAMMING TABLE

| | CONTAINER | | MENU NUMBER | | | | | | | | | | | |
|---|---|---|---|---|---|---|---|---|---|---|---|---|---|---|
| | AREA | SIZE | 1 | 2 | 3 | 4 | 5 | 6 | 7 | 8 | 9 | 10 | 11 | 12 |
| CARRIAGE 1 | | | | | | | | | | | | | | |
| POT ROAST | 1 | 1/2 | | | X | | | | | | | | | |
| STRAINED VEAL | 2 | 1/2 | | | | X | | | | | | | | |
| 60 G LEAN MEAT | 3 | 1/2 | | | | | X | | | | | | | |
| BOILED VEAL | 4 | 1/2 | | | | | | | | | | | | |
| 2 SCRAMBLED EGGS | 5 | 1/3 | | X | | | | | | | | | | |
| ZWIEBACK | 6 | 1/3 | | | X | | | | | | | | | |
| BOILED STEAMED MEAT | 7 | 1/3 | | | | | | | | | | | | |

| | AREA | SIZE | 1 | 2 | 3 | 4 | 5 | 6 | 7 | 8 | 9 | 10 | 11 | 12 |
|---|---|---|---|---|---|---|---|---|---|---|---|---|---|---|
| CARRIAGE 2 | | | | | | | | | | | | | | |
| BOILED POTATOES | 1 | 1/1 | | | X | | X | | | | | | | |
| RICE | 2 | 1/1 | | | | | X | | | | | | | |
| MILK CEREAL | 3 | 1/3 | | | | X | | | | | | | | |
| MESHED POTATOES WITH WATER | 4 | 1/3 | | | | | | | X | | | | | |
| MESHED POTATOES WITH MILK | 5 | 1/3 | | X | | | | | | | | | | |

| | AREA | SIZE | 1 | 2 | 3 | 4 | 5 | 6 | 7 | 8 | 9 | 10 | 11 | 12 |
|---|---|---|---|---|---|---|---|---|---|---|---|---|---|---|
| CARRIAGE 3 | | | | | | | | | | | | | | |
| DIETETIC VEGETABLE | 1 | 1/2 | | X | | | | | | | | | | |
| 2 CHOICES OF VEGETABLE | 2 | 1/2 | | | | | | | | | | | | |
| GREEN BEANS | 3 | 1/3 | | | | X | | | | | | | | |
| 300 G VEGETABLE | 4 | 1/3 | | | | | X | | | | | | | |
| STRAINED LIGHT VEGETABLE | 5 | 1/3 | | | | | | X | | | | | | |
| STRAINED WATER VEGETABLE | 6 | 1/3 | | | | | | | | | | | | |
| BOILED LIGHT VEGETABLE | 7 | 1/3 | | | | | | | | | | | | |
| CARROTS | 8 | 1/3 | | | | | | | | | | | | |

| | AREA | SIZE | 1 | 2 | 3 | 4 | 5 | 6 | 7 | 8 | 9 | 10 | 11 | 12 |
|---|---|---|---|---|---|---|---|---|---|---|---|---|---|---|
| CARRIAGE 4 | | | | | | | | | | | | | | |
| POT ROAST GRAVY | 1 | 1/3 | | | X | | | | | | | | | |
| VEAL GRAVY | 2 | 1/3 | | | | | | | | | | | | |
| LEAN MEAT GRAVY | 3 | 1/3 | | | | | X | | | | | | | |

| | AREA | SIZE | 1 | 2 | 3 | 4 | 5 | 6 | 7 | 8 | 9 | 10 | 11 | 12 |
|---|---|---|---|---|---|---|---|---|---|---|---|---|---|---|
| CARRIAGE 5 | | | | | | | | | | | | | | |
| THICKENED SOUP | 1 | 1/2 | X | | | | | | | | | | | |
| MEAL BROTH | 2 | 1/2 | | | X | | | | | | | | | |
| FAT-FREE BROTH | 3 | 1/3 | | | | | | | | | | | | |
| BROTH WITH FLAVOURS | 4 | 1/3 | | | | | | X | | | | | | |
| FAT-FREE BROTH SOUP | 5 | 1/3 | | | | | X | | | | | | | |
| FRUIT SOUP | 6 | 1/3 | | X | | | | | X | | | | | |

FIG. 4a
PUNCHED CARD MARKINGS (CARRIAGE LOAD CARD WK)

FIG. 4b
PUNCHED CARD MARKINGS (MENU CHART CARD PK)

MENU NUMBER M 1 2 3 4 5 6 7.... SK
M = CMN - 6 (COLUMN)

FIG. 4c
PUNCHED CARD MARKINGS (CUSTOMER CARD MK)

FIG.6

FIG.7
MENU COMPONENTS TABLE

I.  POT ROAST — 1
    STRAINED VEAL — 2
    LEAN MEAT — 3
    BOILED VEAL — 4
    2 SCRAMBLED EGGS — 5×
    ZWIEBACK — 6
    BOILED STEAMED MEAT — 7

II. BOILED POTATOES — 1
    RICE — 2
    MILK CEREAL — 3
    MESHED POTATOES WITH WATER — 4
    MESHED POTATOES WITH MILK — 5×

III. DIETETIC VEGETABLE — 1×
     2 CHOICES OF VEGETABLE — 2
     GREEN BEANS — 3
     300 G VEGETABLE — 4
     STRAINED LIGHT VEGETABLE — 5
     STRAINED WATER VEGETABLE — 6
     BOILED LIGHT VEGETABLE — 7
     CARROTS — 8

IV. POT ROAST GRAVY — 1
    VEAL GRAVY — 2
    LEAN MEAT GRAVY — 3

V.  THICKENED — 1
    MEAL BROTH — 2
    FAT-FREE BROTH — 3
    BROTH WITH FLAVOURS — 4
    FAT-FREE BROTH SOUP — 5
    FRUIT SOUP — 6×

METHOD OF SIGNALING MENU COMPONENTS WHICH ARE TO BE SERVED OUT FROM SUPPLY CONTAINERS OF SUPPLY CARRIAGES ASSOCIATED WITH SUPPLY STATIONS

FIELD AND BACKGROUND OF THE INVENTION

The present invention relates to a method of signaling menu components which are to be served out from supply containers of supply carriages associated with supply stations and positioned at both sides of an endless delivery belt for menu-component receiving trays, using an electronic food serving control.

From German Pat. No. 2,230,493, there is already known a food serving arrangement comprising a plurality of supply carriages which are positioned at both sides of a delivery belt successively receiving trays at one of its ends. The supply carriages are loaded with supply containers for the individual menu components wherefrom the components are taken and placed on the passing trays. The components are taken from the containers manually by servers, in response to lights which are provided on the carriage and indicate the component to be served. In order to determine any possible contents of the supply containers on the supply carriages, three different light arms are necessary, which are exchangeable. The lights are controlled separately for each carriage, through three computing units provided on the carriage, and which detect which kind of light arms is mounted on the respective carriage and process this information along with an information coming from a central control unit.

SUMMARY OF THE INVENTION

The present invention is directed to a method of signaling the menu components received in the supply containers of the supply carriages, in which light arms having always the same number of signal lamps are used, irrespective of the content of the containers, and in which the customer either selects a menu from a predetermined list of menus or composes himself a menu of a number of available menu components.

To this end, in accordance with the invention, a method is provided in which, in a first step, the initial position of each tray is determined and stored and a menu request is read-in and stored, and, in a second step, the passing of the tray by the respective supply stations, and the station numbers assigned thereto, are determined from the initial position of the tray and the predetermined positions of the supply stations, and, upon a coincidence of the data relative to the tray and the supply station, the stored menu request, which has been associated with the tray in the initial position thereof, is retrieved through a menu request address.

An object of the invention is to provide an improved method of signaling menu components which are to be served out from supply containers of supply carriages associated with respective supply stations and positioned along both sides of an endless delivery belt for menu-component-receiving trays and utilizing an electronic food service control.

Another object of the invention is to provide such a method utilizing lamp supporting arms each having the same number of signal lamps thereon and irrespective of the content of supply containers.

A further object of the invention is to provide such a method in which a customer either selects a menu, from a predetermined list of menus, or composes a menu from a number of available menu components or items.

For an understanding of the principles of the invention, reference is made to the following description of typical embodiments thereof as illustrated in the accompanying drawings.

BRIEF DESCRIPTION OF THE DRAWINGS

In the Drawings:

FIG. 1b (1) and 1b (2) conjointly constitute a block diagram corresponding to the electronic food serving control of FIG. 1a;

DESCRIPTION OF THE PREFERRED EMBODIMENTS

Figure 1A:
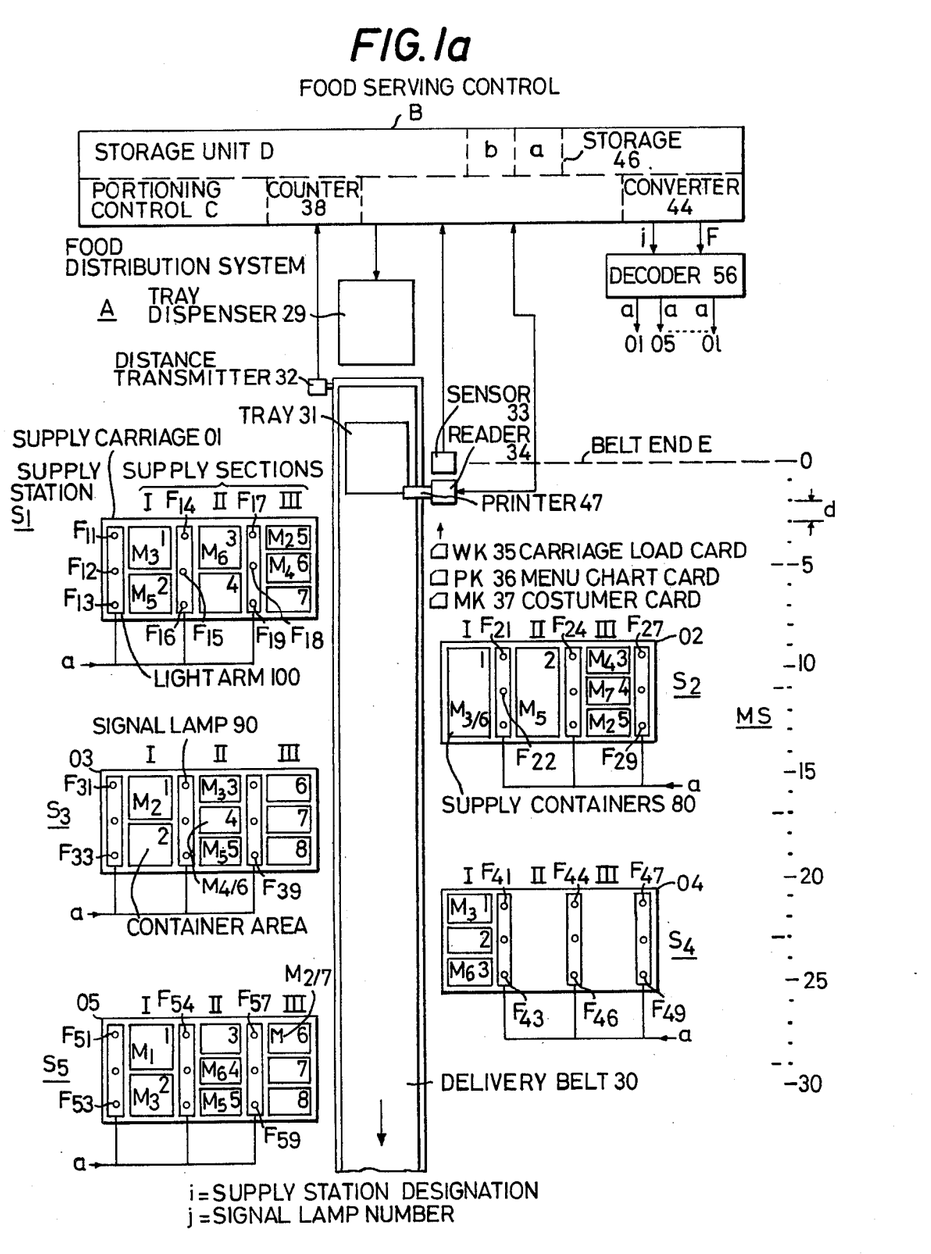
FIG. 1a is a partly schematic plan view of an electronic food serving control in a food distribution system embodying the invention, and used with the input of a predetermined menu.
Figure 1B:
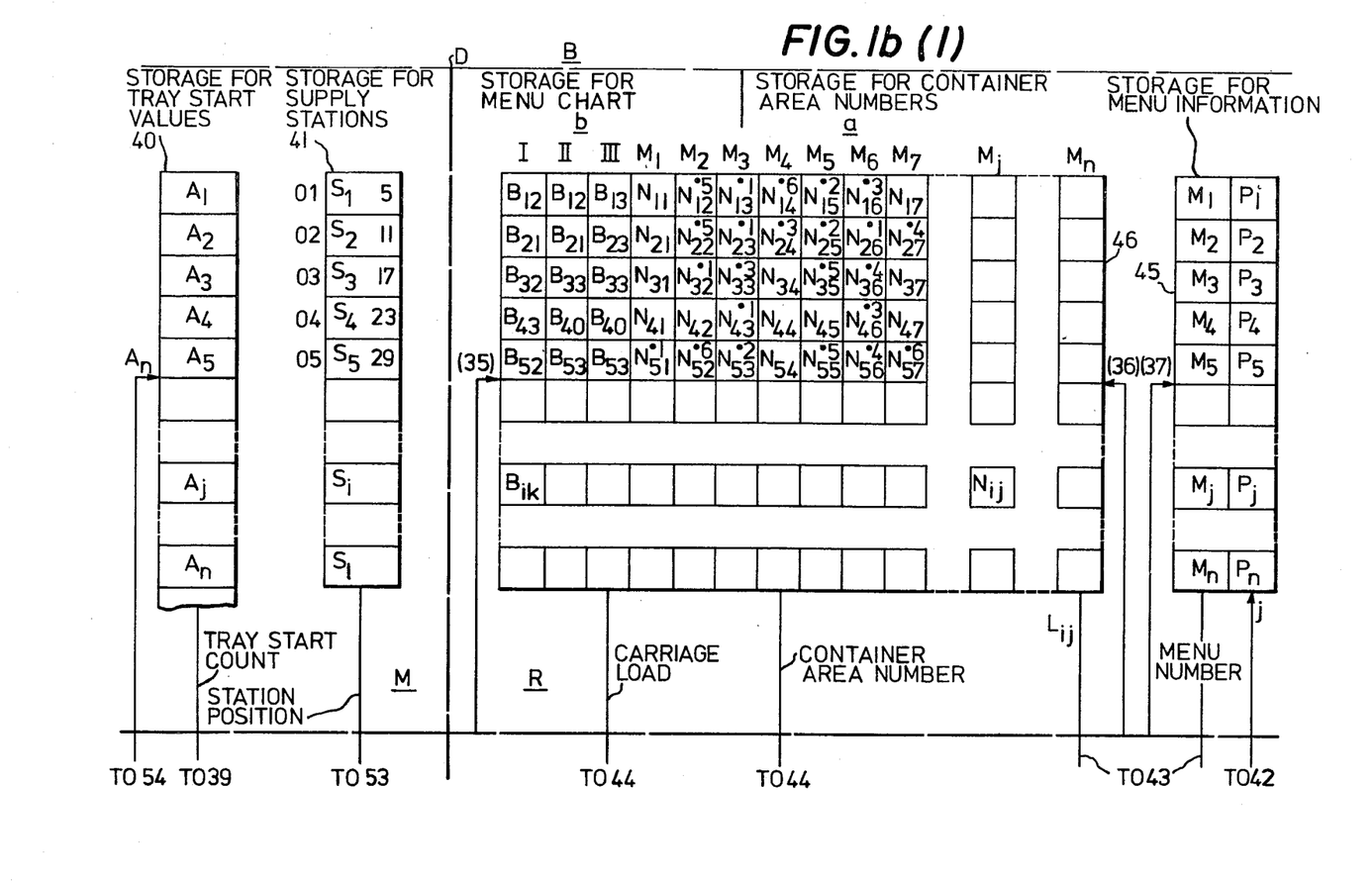

Food Distribution System A (FIG. 1a)

In the food distribution system A, a delivery belt 30 is provided for trays 31 on which plates are supported and which are fed to the belt by a tray dispenser 29. Located at both sides of belt 30 are supply stations $S_1$ to $S_5$ etc. and food supply carriages 01 to 05 etc. on which supply containers 80 of different size are supported containing menu components. For example, up to 14 carriages may be provided. Each carriage is attended by a server who serves the menu component indicated by signal lamp 90 from the respective signaled container 80 to the tray which is just passing the station. In each station, each tray is served only once.

Each carriage is subdivided into three supply sections I, II, III into which, depending on the needed supply, three supply containers 80 of the size 1/1 up to nine containers of the size ⅓ can be inserted in each carriage, container areas 1 up to 9 at most being provided therefor.

Supply carriges 01 to 05 are equipped with light arms 100 each of which carries three signal lamps 90. Each signal lamp of each carriage is associated with a signal lamp number $F_{ij}$. The first subscript designates the supply station and the second one the signal lamp number.

As shown, carriage 01 of station $S_1$ carries four ⅓ size containers 80 occupying container areas 1 to 4 in supply sections I, II, and three ⅓ size containers 80 occupying container areas 5 to 7 in supply section III. The signal lamps of this carriage 01 are associated with signal lamp numbers $F_{11}$ to $F_{19}$. Carrige 02 of station $S_2$ carries two 1/1 size containers 80 occupying container areas 1, 2 in supply sections I, II and three ⅓ size containers 80 occupying container areas 3, 4, 5 in supply sections III. The signal lamps of this carriage 02 are associated with signal lamp numbers $F_{21}$ to $F_{29}$. Carriage 03 carries two ½ size containers 80 occupying container areas 1, 2 in supply section I, and six ⅓ size containers 80 occupying container areas 3 to 8 in supply sections II, III. The signal lamps of this carriage 03 are associated with signal lamp numbers $F_{31}$ to $F_{39}$. Carriage 04 carries only three ⅓ size containers occupying container areas 1 to 3 in supply section I. The signal lamps of this carriage 04 are associated with signal lamp numbers $F_{41}$ to $F_{49}$. Carriage 05 carries two ½ size containers occupying container areas 1, 2 in supply section I, and six ⅓ size containers occupying container areas 3 to 8 in supply sections II, III. The signal lamps of this carriage 05 are associated with signal lamp numbers $F_{51}$ to $F_{59}$.

In accordance with the carriage load, the signal lamps associated with each supply section are switched on by a food serving control B in a manner such that the predetermined container areas are definitely identified. With a single 1/1 size container in a supply section (for example, carriage 02, supply section I or II), the middle signal lamp (signal lamp numbers $F_{i2}$, $F_{i5}$) of a light arm is switched on, with two ½ size containers in a supply section (for example, carriage 01, supply section I or II), the two end signal lamps (signal lamp numbers $F_{i1}$, $F_{i3}$, $F_{i4}$, $F_{i6}$) of a light arm are switched on, and with three ⅓ size containers (for example, carriage 01, supply section III), all three signal lamps (signal lamp numbers $F_{i7}$ to $F_{i9}$) are switched on.

For a better understanding, the menu numbers $M_1$ to $M_7$ associated with the menus of a food program table described herinafter (FIG. 3) are indicated in the container areas. As indicated in FIG. 1a, the individual components for the menu having the menu number $M_1$ are placed on carriage 05, container area 1. For the menu having the menu number $M_2$, the individual components are placed on carriage 01, container area 5; carriage 02, container area 5; carriage 03, container area 1; and carriage 05, container area 6.

The continuous path of delivery belt 30 is subdivided into path units $d$ as indicated on scale MS. For each covered path unit, a path transmitter 32 produces, for example, a belt pulse actuating a counter 38 of the portioning control C of food serving control B. The indication of counter 38 represents the path information of delivery belt 30.

At the receiving end E of delivery belt 30, a sensor 33 is provided reporting the trays 31, received by belt 30 from the tray dispenser 29, to portioning control C. The distance between sensor 33 and supply stations $S_1$ to $S_5$ etc. is, in each instance, a whole multiple (for example, 5, 11, 17, 23, 29, etc.) of path unit $d$.

Also at the receiving end of belt 30, a data reader 34 is provided by means of which the information of the data supports, for example, punched cards 35, 36, 37, is read into food serving control B. Instead of punched cards, other information supports such as punched tapes, magnetic tapes, or the like, may also be used.

As soon as the data of a tray and a supply station coincide, food serving control B delivers a signal lamp number $j$ (1 to 9) and a station number $i$ to a decoder 56.

The nine signal lamps 90 of each carriage are connected to decoder 56 through individual lines, i.e. nine lines $a$.

Preparation of Data for the Control B of FIG. 1b

The food serving is preceded by a food programming. As may be learned from a part of such a program shown in FIG. 2, in a menu chart (which may comprise up to 64 menus) prepared in the kitchen for the customers, a menu number 1, 2, 3, etc. is associated with each menu which includes a plurality of components. This menu chart serves for establishing a food program table such as shown in FIG. 3, which table includes all the menu components of the program of FIG. 2. In the columns indicated "menu number", the components listed in the menu chart are checked and the repartition of supply containers 80 is indicated in columns "container area" and "container size" in accordance with the needed quantity of the respective food. The five supply carriages considered in the food program table of FIG. 3 are shown in FIG. 1a with their indicated load of supply containers.

Figure 4A:
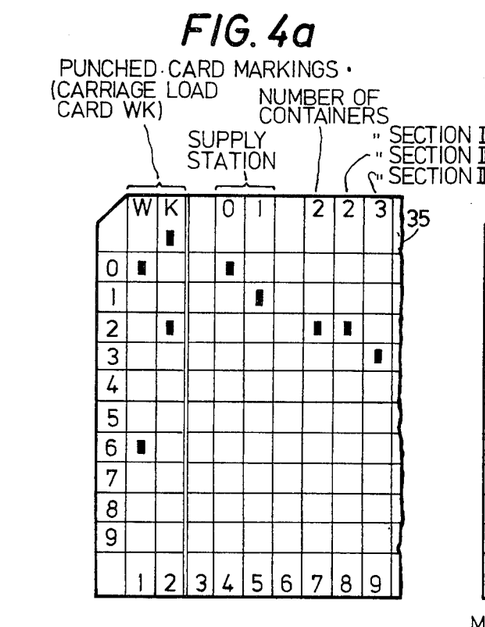
FIGS. 4a, 4b and 4c are plan views of three information supports, designed as punched cards, for the control shown in FIGS. 1b (1) and 1b (2)

In accordance with this food program, a carriage load card 35 (FIG. 4) and a menu chart card 36 (FIG. 4) are provided. Carriage load card 35 comprises an information about the number and size of the supply containers. FIG. 4a shows an example of sectioning of such a punched card 35 for supply carriage 01 (FIG. 1a). Columns 1, 2 indicate the kind of the punched card "WK" and columns 4, 5 the supply carriage 01, while columns 7 to 9 indicate the number of containers in each supply section I to III (FIG. 1a). The number of containers simultaneously determines the size thereof.

Figure 3:
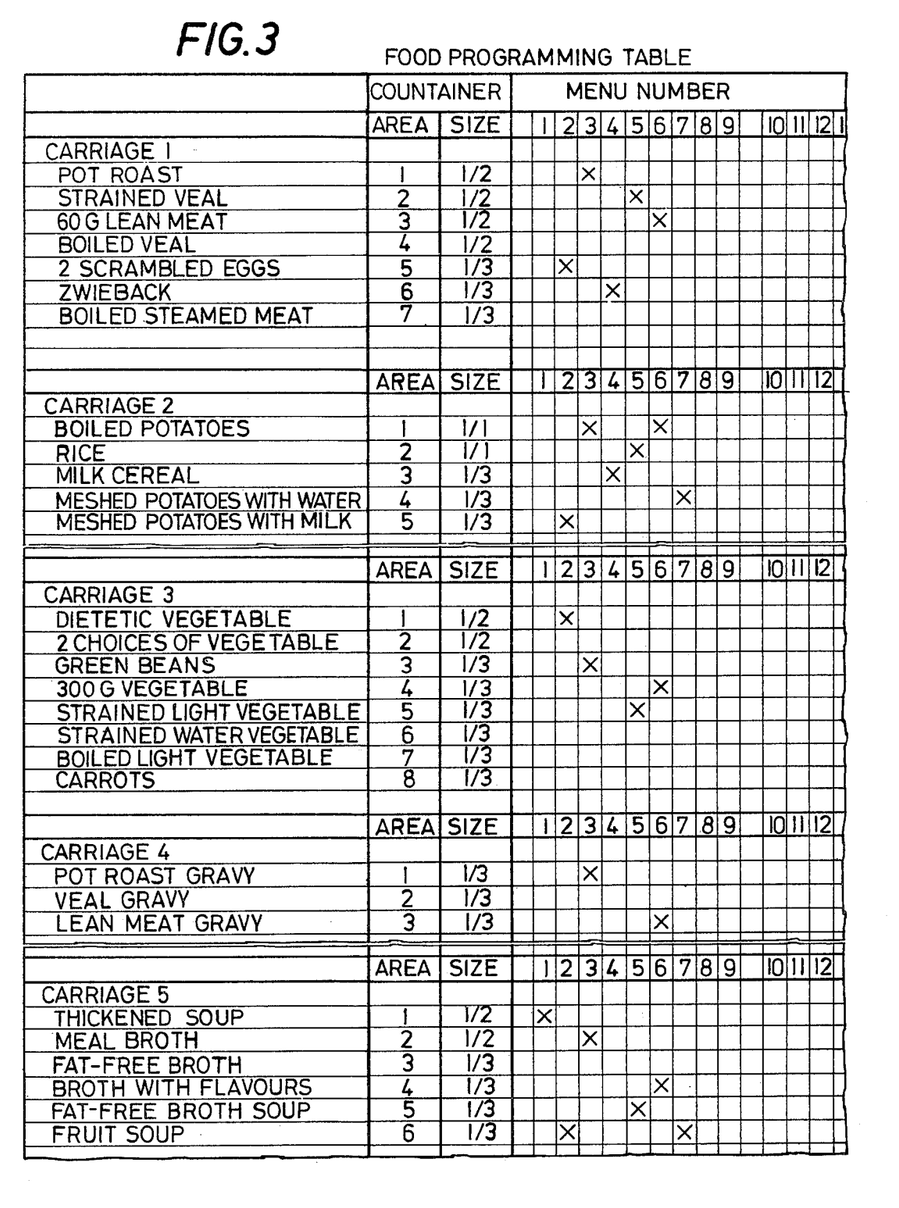
FIG. 3 is a food program table derived from the menu chart of FIG. 2.
Figure 4B:
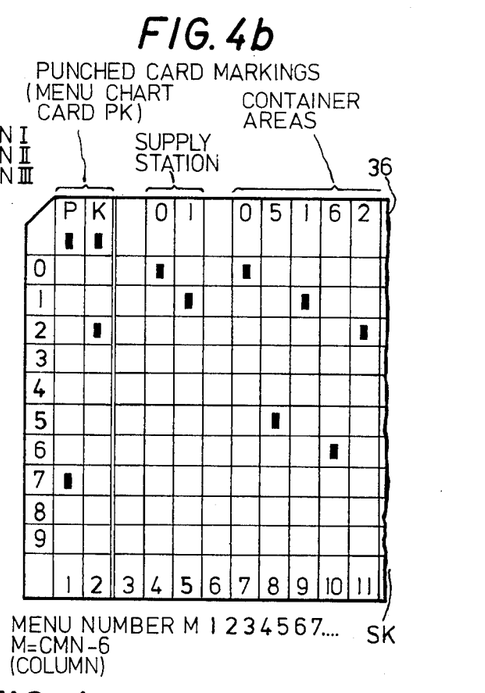

The association of the supply containers with the corresponding menu number is entered in menu chart card 36. As shown in FIG. 4b, the first two columns indicate the kind of the punched card "PK", columns 4, 5 indicate the supply carriage 01 and columns 7 et seq. the containers associated with the menu numbers. The columns SK indicate the respective container area. Thus, in this example, for menu 1, no component is present in supply carriage 01, for menu 2, one component is located in container area 5, for menu 3, one component is in container area 1, for menu 4, one component is in container area 6, for menu 5, one component is in container area 2, for menu 6, one component is in container area 2, for menu 6, one component is in container area 3, and for menu 7, no component is present in carriage 01. The number of columns minus 6 is the menu number (M = Cmn − 6), as indicated in FIG. 4b. The punching of the column indicates the associated container area for the menu component checked in the food program table of FIG. 3.

Figure 2:
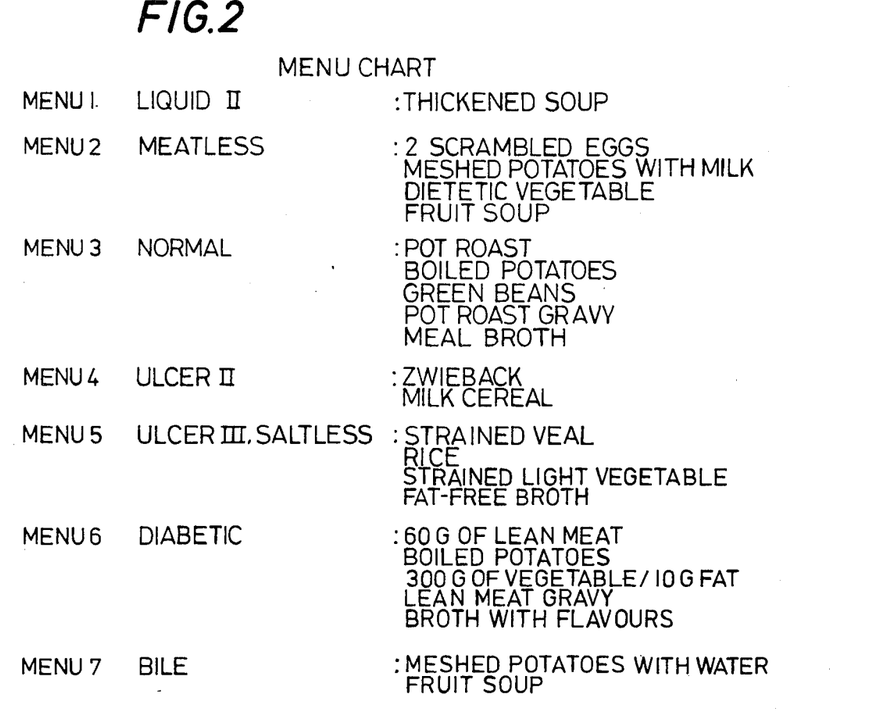
FIG. 2 is a menu chart, with predetermined menu components for each menu, useable with a control such as shown in FIGS. 1b (1) and 1b(2)
Figure 4C:
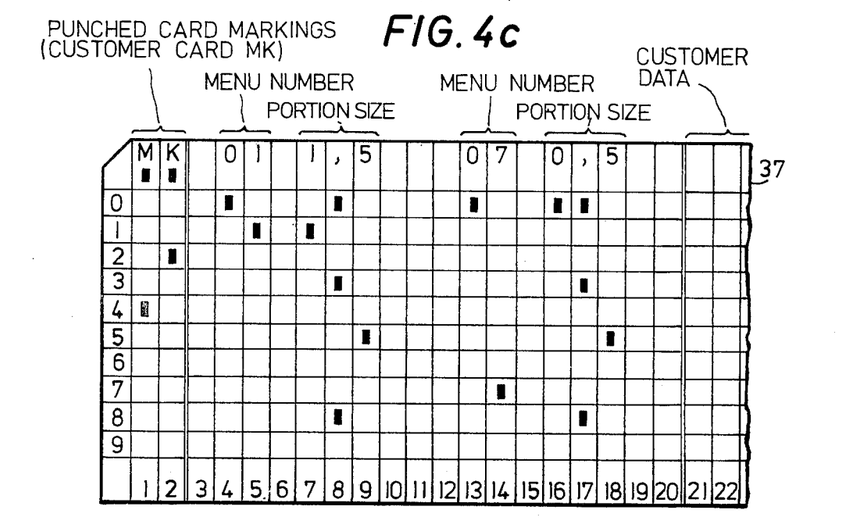

The menu or type of diet the customer has selected from the menu chart of FIG. 2 is entered in customer card 37 as partially shown in FIG. 4c. Columns 1, 2 indicate the kind of punched card "MK", columns 4, 5 a first menu 1 for a first serving, columns 7 to 9 a second menu 7 for a second serving, columns 16 to 18 the portion size thereof, and from column 22, the data of the customer (name, etc.) are entered.

Thus, the information on the carriage loads (card 35) and the menu chart (card 36) is present in the form of a pile of punched cards and is entered, prior to the serving of the menu components and through reader 34 (FIG. 1a), into the portioning control C where they are discriminated by their marking "WK" and "PK"; this makes it possible to change the menu chart and carriage load also during the serving of the components. The information of cards, 35, 36 is stored in respective parts a and b of storage 46 of storage unit D.

Portioning Control C and Storage Unit According to FIG. 1b

As shown in FIGS. 1b(1) and 1b(2), the portioning control C comprises a function group N including the already mentioned counter 38 which picks up the covered distance of delivery belt 30 and keeps it ready as an actual distance information. Distance information Z is delivered to a subtracter 39 which receives the initial tray values $A_j$, picked up by sensor 33 and counter 38, from a storage 40 which is included in a function group M of storage unit D. The last tray fed on the belt and sensed in each instance is designated $A_n$. Sensor 33 controls a reception control 54 through which the indication of counter 38 is then entered into storage 40. Subtracter 39 controls a comparator 42 which, in addition, is controlled, through a control 53, by the positions of supply stations $S_i$, which are entered in a storage 41, and which positions represent set points. Output $K_2$ of comparator 42 is applied to a decoder 43, which is provided in function group P, of portioning control C, and to a converter 44. Output $K_3$ of comparator 42 is applied to storage 45 for the menu information and portion sizes, which is provided in function group R of storage unit D and which delivers menu numbers $M_j$ to decoder 43 wherefrom the decoded numbers are supplied to part a of a storage 46 for the menu chart and the container area number. Part a contains the menu numbers, carriage numbers and container area numbers for the menu components of all menus, which have been read in by means of menu chart cards 36 prior to the component serving, and can be addressed. In part b of storage 46, after the carriage load cards 35 for each carriage have been read in, the number $B_{ik}$ of supply containers 80 in each supply sector I, II, III is stored. Converter 44 is connected not only to comparator 42 but also to parts a, b of storage 46.

Each column of storages 46 (FIG. 1b(1) contains the components and their association with the stations for a complete menu. The points indicate the storage cells with the contents 1 to 9, which have been occupied in accordance with the food program table of FIG. 3. For example, if the menu number $M_1$ is activated in storage 45 by comparator 44, in part a of storage 46, $N_{51}$ with the container area number 1 (thickened soup, FIG. 3) is called up for carriage 05. If menu number $M_2$ is activated, then sequentially, each time the tray associated with menu number $M_2$ passes at supply stations $S_1$ to $S_3$ and $S_5$, $N_{12}$ with the container area number 5 (scrambled eggs) for supply carriage 01, $N_{22}$ with the container area number 5 (mashed potatoes with milk) for carriage 02, $N_{32}$ with container area number 1 (dietetic vegetable) for carriage 03, and $N_{52}$ with container area number 6 (fruit soup) for carriage 05 are called up. For menu number $M_1$, part b of storage 46 delivers the information $B_{52}$. For menu number $M_2$, part b delivers sequentially, upon coincidence of the tray associated with this menu number with supply stations $S_1$, $S_2$, $S_3$ and $S_5$, the information $B_{1k}$, $B_{2k}$, $B_{3k}$, $B_{4k}$ ($k = 1 - 3$) which, along with the container area number of part a of storage 46 and the station number address $i$ delivered by comparator 42, are converter, by converter 44, into a signal lamp number F and a station number $i$. The F and $i$ values of converter 44 control decoder 56 so that a lamp signal is switched on through one of the 1 to 9 lines a thereof.

Menu Component Serving with the Control of FIG. 1b

Prior to the serving of the menu components, the positions of supply stations relative to the receiving end E of delivery belt 30 are entered as set points into storage 41. Further, the menu chart with the association between menu number $M_j$ and the container areas at which the components of this menu are located, is entered into part a of storage 46, while the carriage loads with the information about the subdivision of the carriages is stored in part b of storage 46. For the serving of the menu components, it remains to call up the menu (menu number $M_j$) by means of customer card 37, whereupon portioning control C takes the information $N_{ij}$ from storage 46.

The information of customer cards 37 is read in storage 45 for the menu information and are processed, with the information about the menu chart and the carriage loads, in synchronism with the tray sensing belt (belt end E) while using the information about the position of the trays on delivery belt 30.

Tray dispenser 29 (FIG. 1a) receives an instruction from portioning control C to place a tray on delivery belt 30.

As soon as a first tray travels past sensor 33, the sensor delivers a signal to portioning control C through which the actual indication of counter 38 is entered ($A_1$) into storage 40 for the trays starts and, further, an instruction is given to reader 34 to read in a customer card 37 the information of which is directed by portioning control C to storage 45 where it is stored. Thereby, the first menu request is entered. The read-out customer card 37 may, for example, be dropped on the tray. Thereupon, tray dispenser 29 receives, from portioning control C, a signal for feeding another tray. As soon as this next tray passes sensor 33, the new actual indication of counter 38 is entered in storage 40 as the second start value $A_2$ while the information of a next customer card 37 is read in and entered into the storage 45. This operation is repeated for each newly fed tray, so that, successively, the tray start values $A_j$ are entered into storages 40 and, at the same time, the menu number $M_j$, with portion sizes $P_j$, are entered into storage 45. Therefore, tray start values $A_j$ and the associated menu number $M_j$ are firmly related to each other.

A menu information is delivered each time the distance covered by a tray corresponds to the distance between the belt end E and the respective supply station $S_i$. The difference between the start value of the tray and the actual distance information Z, of counter 38, is the covered distance (actual value) which is compared with the predetermined set values of the supply station stored in storage 41. As soon an equality is detected by comparator 42, a signal lamp number is delivered to the supply station $S_i$ corresponding to the respective set value, provided that the associated supply carriage carries a menu component which is associated with the selected menu. Assuming the menu number $M_1$ is associated with the first sensed tray, none of the signal lamps 90 of carriages 01 to 04 will be switched on during the travel of the tray past stations $S_1$ to $S_4$, because these carriages do not contain any component for menu number $M_1$. However, as the tray reaches supply station $S_5$, signal lamp $F_{51}$ of carriage 05 will be switched on. Let us assume that the second tray is associated with menu number $M_2$. Then, as the tray travels past supply stations $S_1$ to $S_5$, signal lamp $F_{17}$ for container area 5 of carriage 01, signal lamp $F_{29}$ for container area 5 of carriage 02, signal lamp F$_{31}$ for container area 1 of carriage 03, and signal lamp F$_{57}$ for container area 6 of carriage 05 will be successively switched on.

Thus, from the actual distance information Z of counter 38 and the tray start values A$_j$ of storage 40, subtracter 39 determines the position of the tray on delivery belt 30, wherefrom, and from the station positions stored in storage 41, in case of a coincidence of tray and station positions, a station number address *i* and a menu request address *j* are formed by means of comparator 42. The station number address is entered in decoder 43 and converter 44 and the menu number address in storage 45. From menu number M$_j$ of storage 45, decoder 43 forms an address L$_{ij}$ for part *a* of storage 46, so that, at the output of part *a*, the container area number N appears and is supplied to converter 44. Converter 44 also receives the carriage load from part *b* of storage 46 and forms therefrom, and from the station number address *i*, a signal lamp number F and a station number *i*.

Function groups M, N determine the coincidence of tray and supply station and deliver a menu request address *j* and a station number address *i*, while function groups P, R, on the basis of this information, determine the container area number N$_{ij}$ and the carriage load B$_{ik}$ from menu number M$_j$, and, therefrom, the signal lamp number F, which values, along with the station number, control decoder 56 by which a corresponding signal is delivered.

Determination of the Supply Station

After each time pulse produced by the belt travel transmitter 32, the presence of a tray in one of the supply stations S$_i$ is checked in order to switch on the corresponding signal lamps.

In a first step, from the indication of counter 38, a first value H$_1$ is formed which appears at the output of subtractor 39:

$$H_1 = Z - A_j > 0 \qquad 1.$$

From the difference between value H$_1$ and the station position S$_i$, a second value H$_2$ is formed by means of comparator 42, which value indicates whether the last tray A$_n$ received on delivery belt 30 is already present at the first supply station S$_1$:

$$H_2 = H_1 - S_i$$

As long as H$_2$ <0, last tray A$_n$ has not yet reached station S$_1$ and, for checking this fact, in a second step, the position of the preceding tray is used and the difference prec.*j* = *j* − 1 formed:

$$H_2 < 0 \qquad 2.$$

$$prec.j = j - 1.$$

Going back to step 1, there is checked whether, with A$_{j-1}$, the second value is H$_2$ = 0. If this is the case, an indication appears at supply station *i* for the menu information *j*. If the second value H$_2$ = 0, the further proceding trays are used for checking, until the value H$_2$ = 0 is obtained for the second value, whereby it is determined that one of the trays preceding the last one is present in station S$_1$. If the second value H$_2$ > 0, the last sensed tray has already passed beyond first station S$_1$, in this case, foll.*i* = *i* + 1 is formed:

$$H_2 > 0 \qquad 3.$$

$$foll.i = i + i.$$

Going back to step 1, there is checked whether the tray is present at the second station S$_2$.

Thus, for checking whether a tray is present at a supply station, the tray start values A$_j$ of storage 40 and the predetermined positions S$_i$ of storage 41 are used, and the checking commences at the first station S$_1$.

If coincidence (H$_2$ = 0) of tray and station is determined, the menu information M$_j$, received in storage 45, and information N$_{ij}$ and carriage load B$_{ik}$, stored in storage 46 and associated with this tray, are retrieved, and the signal lamp number is determined, whereupon a menu component for the menu information M$_j$ is indicated at supply station S$_i$.

The determination of coincidence between tray and supply station and of signal lamp number F takes place between two time pulses of path or travel transmitter 32.

In the following example, S$_1$ = 5, S$_2$ = 11, S$_3$ = 17, S$_4$ = 23, S$_5$ = 29. It is further assumed that the last three received trays (*j* = 3) are taken into account: A$_3$ = 100, A$_2$ = 80 and the indication of counter 38 is 103.

In a first step, H$_1$ = Z − A$_j$ and H$_2$ = H$_1$ − S$_i$ are formed by subtracter 39 and comparactor 42:

$$H_1 = 103 - 100 = 3 \qquad 1.$$

$$H_2 = 3 - 5 = -2 < 0$$

Since the result <0, the next to last tray is taken into account:

$$j = j - 1 = 3 - 1 = 2$$

Back to step 1:

$$H_1 = 103 - 80 = 23$$

$$H_2 = 23 - 5 = 18 > 0$$

The result is >0 and station S$_2$ is taken into account:

$$i = i + 1 = 2$$

Back to step 1:

$$H_1 = 103 - 80 = 23$$

$$H_2 = 23 - 11 = 12 > 0$$

Since the result >0, the following station S$_3$ is taken into account:

$$i = i + 1 = 3$$

Back to step 1:
$$H_1 = 103 - 80 = 23$$

$$H_2 = 23 - 17 = 6 > 0$$

The result is still >0, so that station S$_4$ is taken into account:

$$i = i + 4$$

Back to step 1:

$$H_1 - 103 - 80 = 23$$

$H_2 = 23 - 23 = 0$

Consequently, the next to last tray is present in station $S_4$.

DETERMINATION OF THE SIGNAL LAMP

While retrieving menu member $M_j$ and supply station $S_i$ stored in storage 41, decoder 43 determines, from part $a$ of storage 46, the container area number $N_{ij}$ (1 to 9) which is supplied to converter 44. If, for example, the number 3 is determined, lamp $F_{14}$ of the light arm associated with supply section II of carriage 01 must be switched on, while, on the differently loaded carriage 02, lamp $F_{27}$ of the light arm associated with supply section III must be switched on.

Figure 5:
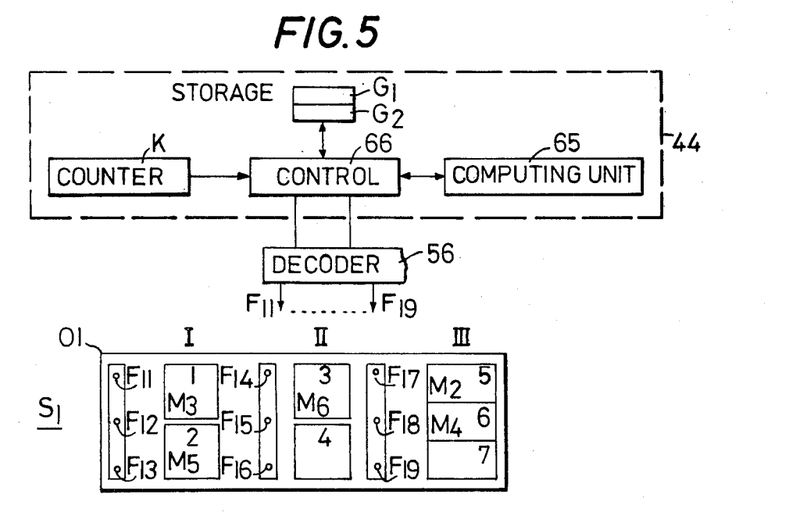
FIG. 5 is a block diagram providing a more detailed illustration of the arrangement for determining the signal lamps associated with the supply containers.

Converter 44 is shown in more detail in FIG. 5 which is described in the following in connection with supply carriage 01.

Two storages $G_1$, $G_2$, a counter K and a computing unit 65 are provided which are connected through a control unit 66. In its initial position, counter K indicates $k = 0$. The information (number 1 to 9) of storage 46 is first received in both storages:

$$k = 0, G_1 = N, G_2 = N \qquad 0.$$

In a first counter step, it is determined whether the number corresponds to a container area in supply section I of carriage 01. This is done by forming the difference between this number and the container area number $B_{ik}$ of supply section I for supply station $S_i$ received in part $b$ of storage 46:

$$k = k + 1, G_1 = G_2 \qquad 1.$$

$$G_2 = G_1 - B_{ik}$$

If the result is $\leq 0$, the signal lamp number F is in supply section I. With a 1/1 size container ($B_{ik} - 1$), the signal lamp number is determined in accordance with the formula $$F = 2 + 3(k - 1),$$

with two $\frac{1}{2}$ size containers ($B_{ik} = 2$) and $G_1 = 1$ after the formula $$F = 1 + 3(k - 1)$$

and for $G_1 = 2$ after the formula $$F = 3 + 3(k - 1),$$

with three $\frac{1}{3}$ size containers ($B_{ik} - 3$) after the formula $$F = G_1 + 3(k - 1).$$

If the result $>0$, the signal lamp number F is in supply section II or III. In this case, one goes back to step 1:

$$G_2 > 0 \text{ step } 1$$

so that the resulting counter indication is $K = k + 1 - 2$ and $G_2$ is again formed of $G_1 - B_{ik}$, which is repeated while increasing the counter indication $k = k + 1 - 3$ should the results be still $G_2 > 0$.

In the following, the determination of the signal lamp number F on supply carriage 01 is explained in more detail while assuming that the numbers 1 to 5 of part $a$ of storage 46 corresponding to containers areas 1 to 5 are given.

| | | |
|---|---|---|
| N = 1 | | |
| 0. counter step | : | $k = 0, G_1 = N = 1$ |
| 2. counter step | : | $k = k + 1; G_2 = G_1 - B_{21} = 1 - 2 = -1 < 0$ |
| | | $B_{21} = 2$ |
| | | $F = 1 + 3(1 - 1)$ |
| | | $F = 1$ |
| N = 2 | | |
| 0. counter step | : | $k = 0, G_1 = N = 2$ |
| | | $k = k + 1 = 1; G_2 = G_1 - B_{21} = 2 - 2 = 0$ |
| | | $F = 3 + 3(1-1)$ |
| | | $F = 3$ |
| N = 3 | | |
| 0. counter step | : | $k = 0, G_1 = N = 3$ |
| 1. counter step | : | $k = k + 1 = 1; G_2 = G_1 - B_{21} = 3 - 2 = 1 > 0$ |
| 2. counter step | : | $k = k + 1 = 2; G_2 = G_1 - B_{21} = 1 - 2 = -1 < 0$ |
| | | $F = 1 + 3(2 - 1)$ |
| | | $F = 4$ |
| N = 4 | | |
| 0. counter step | : | $k = 0; G_1 = N = 4$ |
| 1. counter step | : | $k = k + 1; G_2 = G_1 - B_{21} = 4 - 2 = 2 > 0$ |
| 2. counter step | : | $k = 2; G_2 = G_1 - B_{21} = 2 - 2 = 0$ |
| | | $F = 3 + 3(2 - 1)$ |
| | | $F = 6$ |
| N = 5 | | |
| 0. counter step | : | $k = 0; G_1 = N = 5$ |
| 1. counter step | : | $k = 1; G_2 = G_1 - B_{21} = 5 - 2 = 3 > 0$ |
| 2. counter step | : | $k = 2; G_2 = G_1 - B_{21} = 3 - 2 = 1 > 0$ |
| 3. counter step | : | $k = 3; G_2 = G_1 - B_{21} = 1 - 2 = -1 < 0$ |
| | | $F = 1 + 3(3 - 1)$ |
| | | $F = 7$ |

Figure 6:
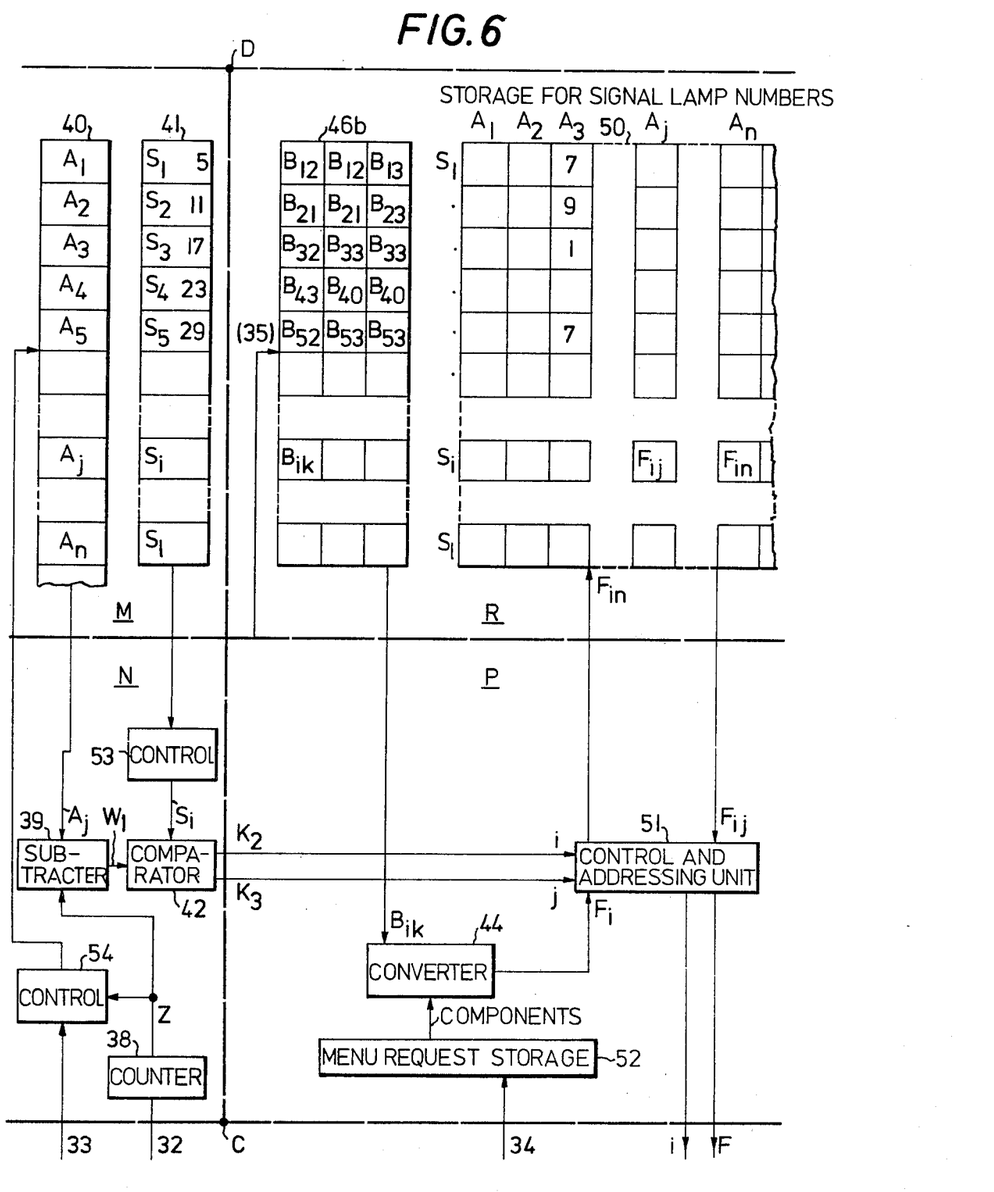
FIG. 6 is a block diagram of an electronic food serving control useable with the input of individual menu components.

Portioning Control C and Storage Unit D According to FIG. 6

In the food serving control according to FIG. 6, the same function groups M, N for determining the coincidence of tray and supply station are provided Function group R comprises only storage part 46b for the carriage load and a storage 50 for the signal lamp numbers, while function group P comprises converter 44, a control and addressing unit 51 and a menu request intermediate storage 52. Intermediate storage 52 furnishes the menu components read in to converter 44 which also receives the carriage load $B_{ik}$. The signal lamp number $F_i$ determined by converter 44 is entered, through control and addressing unit 51, into storage 50. Control and addressing unit 51 is actuated by the station number address $i$ and the menu request address $j$ of comparator 42 and delivers the signal lamp number F and the station number $i$ to decoder 56.

Data Preparation for the Control According to FIG. 6

Figure 7:
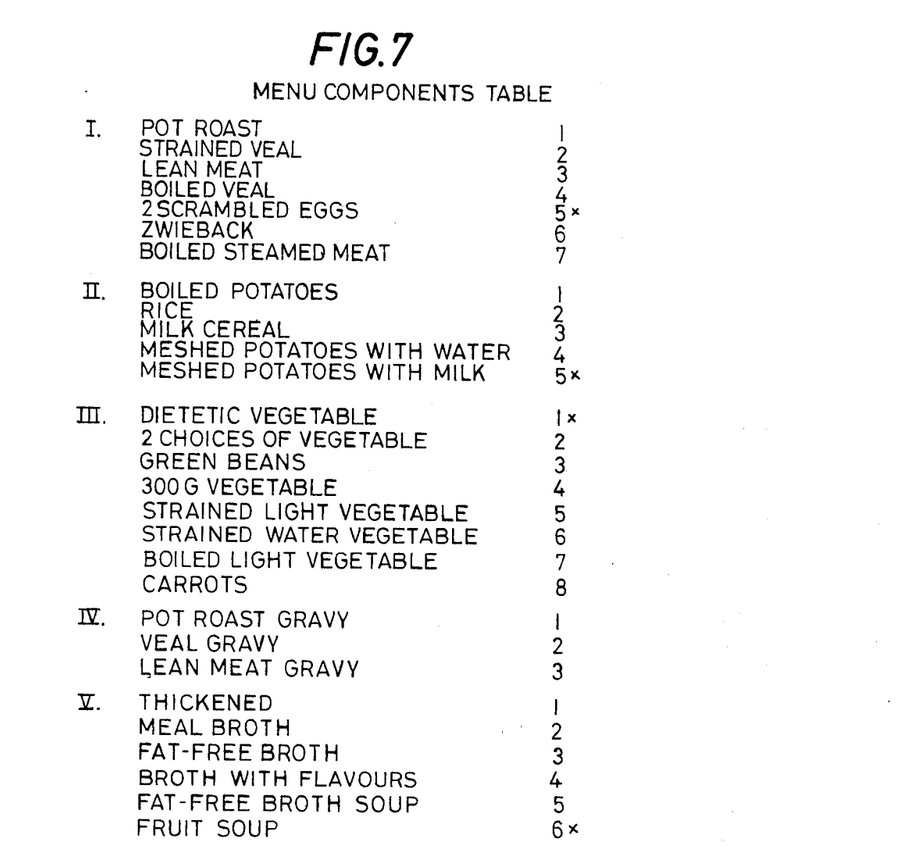
FIG. 7 is a menu component chart useable with the control shown in FIG. 6.

In the food serving control according to FIG. 6, the customer can compose the menu he likes, from a number of menu components. For example, a menu component list may be available to the customer, such as shown in FIG. 7. For reasons of simplicity, this list contains the same menu components which have already been indicated in FIG. 2. The menu may be composed in any other suitable manner, for example, as provided in German Pat. No. 2,319,040, by means of information supports for menu components.

If a menu component list, such as in FIG. 7 is provided, the customer only checks the components he wishes. Let us assume that the components corresponding to menu 2 of FIG. 2 are selected, as checked in FIG. 7.

Figure 8:
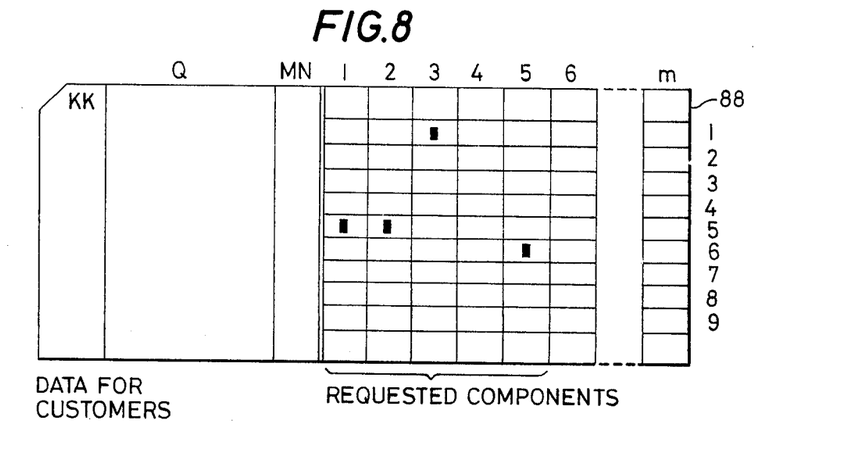
FIG. 8 is a plan view of an information support useable with the control shown in FIG. 6.

The selected components are transferred to a component card 88 as shown in FIG. 8, which card is marked "KK". In its window Q, the card may be provided with personal data. Column MN may be provided for menu numbers so that card 37 of FIG. 4c is included at the same time. The card has 1 to $m$ columns for $m$ supply stations and 1 to 9 lines for the container areas in accordance with the checking of the list of components in FIG. 7, columns 1 to 3 and 5 and container areas 5, 5, 1 and 6 are punched in the showing of FIG. 8.

Input of Menu Components with the Control According to FIG. 6

As in the control of FIG. 1b, each time a tray is sensed by sensor 33, reader 34 is activated so that the menu components representing a complete menu and indicated in component card 88 are supplied to intermediate storage 52. From the individual components and the carriage load $B_{ik}$ of partial storage 46b, converter 44 determines the signal lamp numbers $F_i$ which are entered, through control and addressing unit 51, into last column $A_n$ of storage 50. The respective last information read in is stored in Column $A_n$ as signal numbers $F_{in}$. Control and addressing unit 51 knows the number of sensed trays (counter or the like) and causes a corresponding entry of the signal lamp numbers $F_i$ delivered by converter 44 into one column of storage 50. If, for example, the third tray is just sensed by sensor 33, control and addressing unit 51 provides for the entry of signal lamp numbers $F_{in}$ into the third column $A_3$ of storage 50, as indicated. In this instance it is assumed that, with the third tray, component card 88 of FIG. 8 having punched container areas 5, 5, 1, 6, has been read in, so that column $A_3$ and line 1 ($S_1$) of storage 50 contain signal lamp number 7, line 2 ($S_2$) signal lamp number 9, line 3 ($S_3$) signal lamp number 1, and line 5 ($S_5$) signal lamp number 7. As mentioned above, for each sensed tray, a component card is read in and the signal lamp numbers corresponding to the individual components are entered column by column in storage 50. The capacity of storage 50 corresponds to the maximum number of trays which can be placed on delivery belt 30.

Serving of Menu Components with the Control in Accordance with FIG. 6

A certain period of time after being sensed, a tray travels past the first supply station, etc. Each time a tray passes by a station, this fact is picked up by the comparator 42 which delivers the station number address $i$ and the menu request address $j$ to control and addressing unit 51, whereby the signal lamp number $F_{ij}$ received in storage 50 is read out and the signal lamp number F and station number $i$ is delivered by control and addressing unit 51. If it is assumed again that the third sensed tray travels past supply station $S_1$, then, at this instant, comparator 42 delivers a station number address $i$ corresponding to 1 and a menu request address $j$ corresponding to 3, to control and addressing unit 51, so that storage element $A_3/S_1$ of storage 50 is activated and signal lamp number 7 is read out and passes, through control and addressing unit 51 (line F), to the decoder. The decoder further receives, from control and addressing unit 51, the station number $i$ corresponding to 1 and delivers, through the line associated with signal lamp number $F_{17}$ (FIG. 1a), a signal for the corresponding signal lamp 90, so that container area 5 of supply carriage 01 is indicated. As the third tray travels past the next supply stations $S_2$, etc., the $i$ and $j$ values ⅔, 3/3, 4/3, 5/3 appear subsequently at the output of comparator 42, so that the signal lamp numbers 9 (corresponding to container area 5 of carriage 02), 1, (corresponding to container area 1 of carriage 03), and 7 (corresponding to container area 6 of carriage 05) are read out of storage 50 and are processed as described above.

Figure 9:
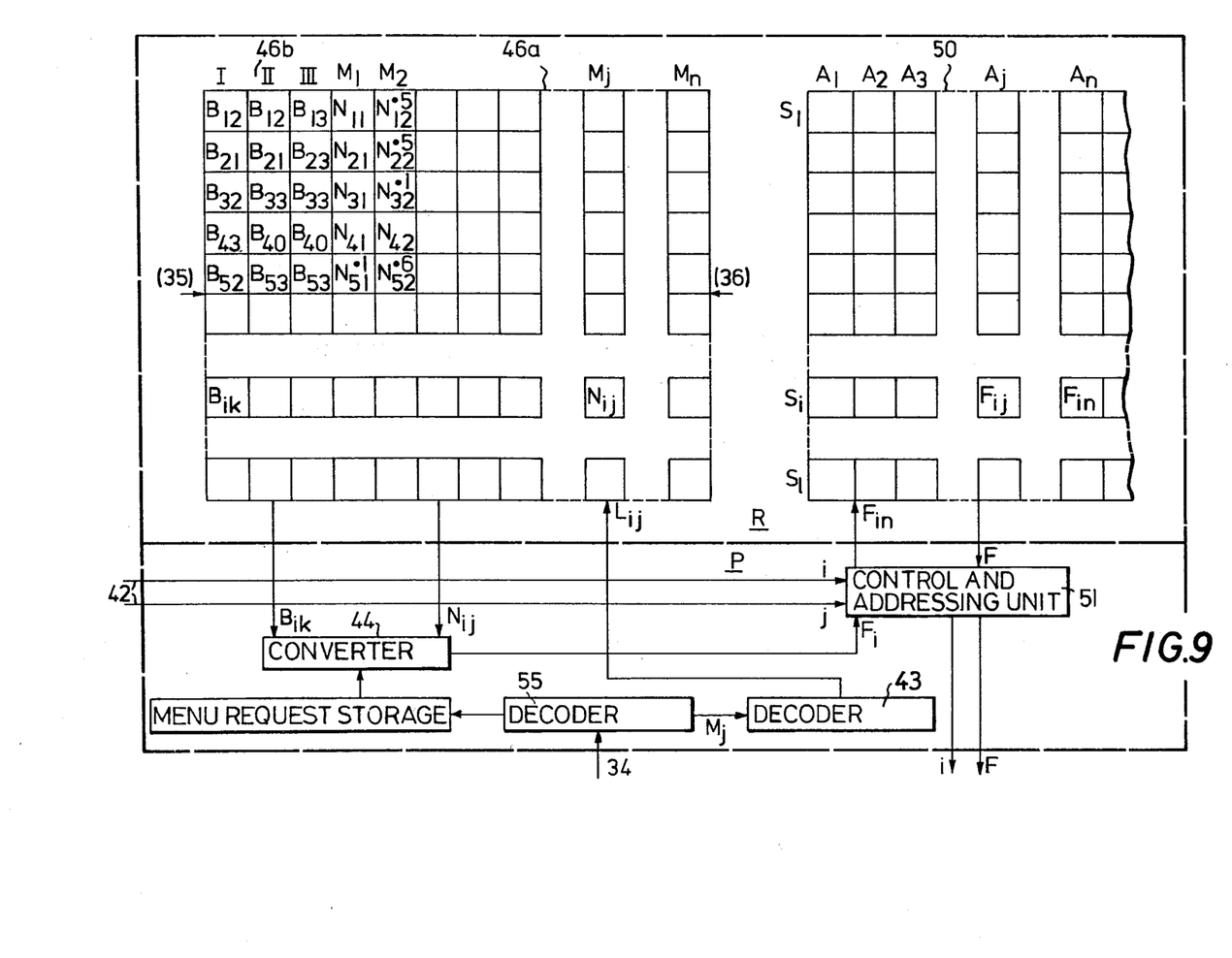
FIG. 9 is a block diagram of an electronic food serving control useable with the input of either predetermined menus or individual menu components.

Portioning Control C and Storage Unit D According to FIG. 9

Since function groups M, N are unchanged in this control, they are not shown in this figure.

Function groups P, R make it possible to process both predetermined menus and menu components. Function group P comprises the decoder 43, converter 44, control and addressing unit 51, the menu request intermediate storage 52, and a second decoder 55. Second decoder 55 receives, from reader 34, the information contained in component card 88, which may be menu components (columns 1 to $m$) or menu members (column MN). In case menu components have been marked, second decoder 55 channels the read information to intermediate storage 52, If menu numbers have been marked, second decoder 55 channels the information to decoder 43.

Function group R comprises the storage 46ab and storage 50. Storage 46 is connected to converter 44 and storage 50 is connected to control and addressing unit 51 which is controlled by comparator 42. Decoder 43 controls storage 46.

Processing of Menu Numbers

The menu numbers read out by reader 34 are directed from second decoder 55 to decoder 43 which calls up the container area numbers $N_{ij}$ and carriage loads $B_{ik}$ received in storage 46. Both informations are supplied to converter 44 in which the signal lamp number $F_1$ is formed and is entered by control and addressing unit 51 into storage 50. If station number addresses $i$ and menu request addresses $j$ appear, a tray is just traveling past a supply station and the signal lamp $F_{ij}$ corresponding to the $i$ and $j$ values is read out from storage 50 and supplied, through control and addressing unit 51 and along with the starting number $i$, to decoder 56.

Processing of Menu Components

If menu components are to be treated, they are directed by the second decoder 55 to menu request intermediate storage 52 wherefrom they are supplied to converter 44. Converter 44 receives, from part $b$ of storage 46, the carriage load $B_{ik}$. The further operation is the same as has been described in connection with the control of FIG. 6.

While specific embodiments of the invention have been shown and described in detail to illustrate the application of the principles of the invention, it will be understood that the invention may be embodied otherwise without departing from such principles.

What is claimed is:

1. In a method of signaling menu components which are to be served out from supply containers of supply carriages associated with respective supply stations having respective assigned station numbers, and positioned along both sides of an endless delivery belt for menu-component-receiving trays, and utilizing an electronic food service control, the improvement comprising, in a first step, determining and storing, in the control, the position of each tray and reading-in and storing in the control a menu request; in a second step, determining from the initial position of each tray and the predetermined positions of the supply stations along the endless delivery belt, the travel of the trays past the stations and the respective assigned station numbers;

and, responsive to coincidence of tray position data and supply station data, retrieving from the control through a menu request address, the respective stored menu request which has been associated with each tray in the initial position of the associated tray on the endless delivery belt.

2. In a method of signaling menu components, the improvement claimed in claim 1, including the steps of, for determining the time at which the menu components are to be served, storing the information relative to the supply station, the container area number and the carriage load, which has been read into the food serving control prior to serving of the components; and, for serving the components, entering the menu request into the food serving control and processing the menu requests while retrieving, from the food serving control, the stored position of the supply stations, the supply container area numbers and the carriage loads in synchronism with the entry of each tray onto the entry end of the endless delivery belt.

3. In a method of signaling menu components, the improvement claimed in claim 1, in which each supply carriage is divided into three sections each including three supply container areas and with each section being capable of receiving either one full size supply container occupying its three container areas, two half-size supply containers occupying its three container areas, or three one-third size containers each occupying one of its container areas, with the container areas being respectively numbered from (1) to (9) and with each container area having a respective correspondingly numbered signal lamp associated therewith, the signal lamp numbers being designated F; determining the signal lamp number F by forming a value from the difference between the present container area number and the number of supply containers; with the value being equal to or greater than zero with a full-size supply container in the first supply section of the supply carriage, determining the signal lamp number F from the formula $F = +3(k - 1)$ where $k$ is the number of container areas; with a value equal to or greater than 1 and with two half-size supply containers in the first supply section of the supply container and with the container area number equal to 1, determining the signal lamp number from the formula $F = 1 + 3(k - 1)$; with the container area number being equal to 2, determining the signal lamp number from the formula $F = 3 + 3(k - 1)$; with the value being equal to or greater than 1 and with three one-third size supply containers in the supply section (1) of the supply carriage, determining the signal lamp number from the formula $F = G_1 + 3(k - 1)$ where $G_1$ is the container area number; responsive to the value being greater than zero, inserting a number of containers increased by 1 and redetermining such value; with the value being still greater than zero, again increasing the number of containers by 1 and again determining such value.

4. In a method of signaling menu components which are to be served out from supply containers of supply carriages associated with respective supply stations having respective assigned station numbers, and positioned along both sides of an endless delivery belt for menu-component-receiving trays, and utilizing an electronic food service control, the improvement comprising, in a first step, determining and storing, in the control, the position of each tray and reading-in and storing in the control a menu request; in a second step, determining from the initial position of each tray and the predetermined positions of the supply stations along the endless delivery belt, the travel of the trays past the stations and the respective assigned station numbers; responsive to coincidence of tray position data and supply station data, retrieving from the control, through a menu request address, the respective stored menu request which has been associated with each tray in the initial position of the associated tray on the endless delivery belt; for determining the time at which the menu components are to be served, storing the information relative to the supply station, the container area number and the carriage load, which has been read into the food serving control prior to serving of the components; for serving the components, entering the menu requests into the food serving control and processing the menu requests while retrieving, from the food serving control, the stored position of the supply stations, the supply container area numbers and the carriage loads in synchronism with the entry of each tray onto the entry end of the endless delivery belt; registering, on a counter, the distance units through which the endless delivery belt travels; storing the count of the counter, at the time a tray enters on the receiving end of the delivery belt, in a storage for tray start values; continuously supplying the count of the counter to a subtracter; controlling the subtracter additionally by the tray start values; utilizing the subtracter to produce an information indicative of the tray position; storing the position values of the supply stations in a further storage; utilizing a comparator to compare the information indicative of the tray position with the position values of the supply station; and deriving, from the comparator, a station number address and a menu request address.

5. In a method of signaling menu components, the improvement claimed in claim 4, including the steps of utilizing the station number address to control a decoder; utilizing the menu request address to control a third storage containing menu numbers; utilizing the decoder to form, from the stored menu numbers, addresses for the stored container area numbers and carriage loads; utilizing the station number addresses to control a converter; and utilizing the converter to further process the stored container area numbers and carriages loads.

6. In a method of signaling menu components, the improvement claimed in claim 5, including the steps of, after each change of count of the counter, and in order to check whether a tray is present at a supply station, utilizing the difference between the tray position, produced by the subtracter, and the station position to form a second value; responsive to such second value being less than zero, taking into account the immediately preceding tray having a lesser tray start value associated therewith, until such second value equals zero; and, responsive to such second value being greater than zero, taking into account the succeeding supply station until such second value equals zero.

7. In a method of signaling menu components, the improvement claimed in claim 4, in which each supply carrier is divided into three sections each having three supply container receiving areas having consecutive area numbers G from (1) to (9) and with each container area having associated therewith a respective signal lamp having a corresponding signal lamp number F from (1) to (9); during the component selection, supplying the menu components and a stored carriage load to a converter in the food service control; utilizing the converter to determine the signal lamp number; utilizing a control and addressing unit in the food service control to enter the signal lamp number into a storage; and, on occurrence of the station number address and the menu request address from the comparator, utilizing the control and addressing unit to read the signal lamp number out from the storage and deliver it with the station number.

8. In a method of signaling menu components, the improvement claimed in claim 4, in which supply carriage is divided into three sections each including three supply container receiving areas having respective numbers from (1) to (9), with a respective signal lamp being associated with each container receiving area, each signal lamp having corresponding number; supplying menu numbers each associated with a predetermined number, to a decoder in the food service control; utilizing the decoder to form addresses for container area numbers and carriage loads; storing the container area numbers and carriage loads in a storage, supplying the stored container area numbers and stored carriage loads to a converter; utilizing the converter to form, from the informations supplied thereto, a signal lamp number; utilizing a control and addressing unit of the food service control to enter the formed signal number into a second storage; on occurrence of the station number address and the menu request address, utilizing the control and addressing unit to read out the stored signal lamp number; supplying the information as to individual components to the converter; responsive to such supply of the individual components to the converter, which is responsive to the carriage load information, utilizing the converter to determine the signal lamp number; utilizing the control and addressing unit to enter the determined signal lamp number into the second storage; and, responsive to occurrence of a station number address and a menu request address, reading out and delivering the determined signal lamp number.

* * * * *